United States Patent [19]

Genovese

[11] Patent Number: 5,365,074

[45] Date of Patent: Nov. 15, 1994

[54] APPARATUS FOR DETERMINING REGISTRATION OF IMAGING MEMBERS

[75] Inventor: Frank C. Genovese, Fairport, N.Y.

[73] Assignee: Xerox Corporation, Stamford, Conn.

[21] Appl. No.: 109,882

[22] Filed: Aug. 23, 1993

[51] Int. Cl.$^5$ ............................................. G01N 21/86
[52] U.S. Cl. .................................. 250/560; 250/548
[58] Field of Search ............ 250/561, 548, 557, 570; 355/41, 53; 356/400; 353/26 A

[56] References Cited

U.S. PATENT DOCUMENTS

| | | | |
|---|---|---|---|
| 3,875,406 | 4/1975 | Holeman | 250/231 |
| 4,422,026 | 12/1983 | Starai | 318/640 |
| 4,683,380 | 7/1987 | Shipkowski et al. | 250/548 |
| 4,837,636 | 6/1989 | Daniele et al. | 358/300 |
| 5,175,570 | 12/1992 | Haneda et al. | 346/160 |
| 5,204,538 | 4/1993 | Genovese | 250/571 |

Primary Examiner—David C. Nelms
Assistant Examiner—Steven L. Nichols
Attorney, Agent, or Firm—Robert Hutter

[57] ABSTRACT

An apparatus is useful for positioning a substrate having an aperture therein movable in a process direction. A photodetector is disposed adjacent a first side of the substrate, in a position intersecting a path of the aperture along the process direction. A first light source point and a second light source point are positioned whereby, when the aperture is disposed between the first light source point and the second light source point and the photodetector, direct light from both the first light source point and the second light source point is capable of being detected by the photodetector. A condition detector detects a condition in which light of substantially equal intensity from the first light source point and the second light source point is detected by the photodetector.

20 Claims, 5 Drawing Sheets

FIG. 4
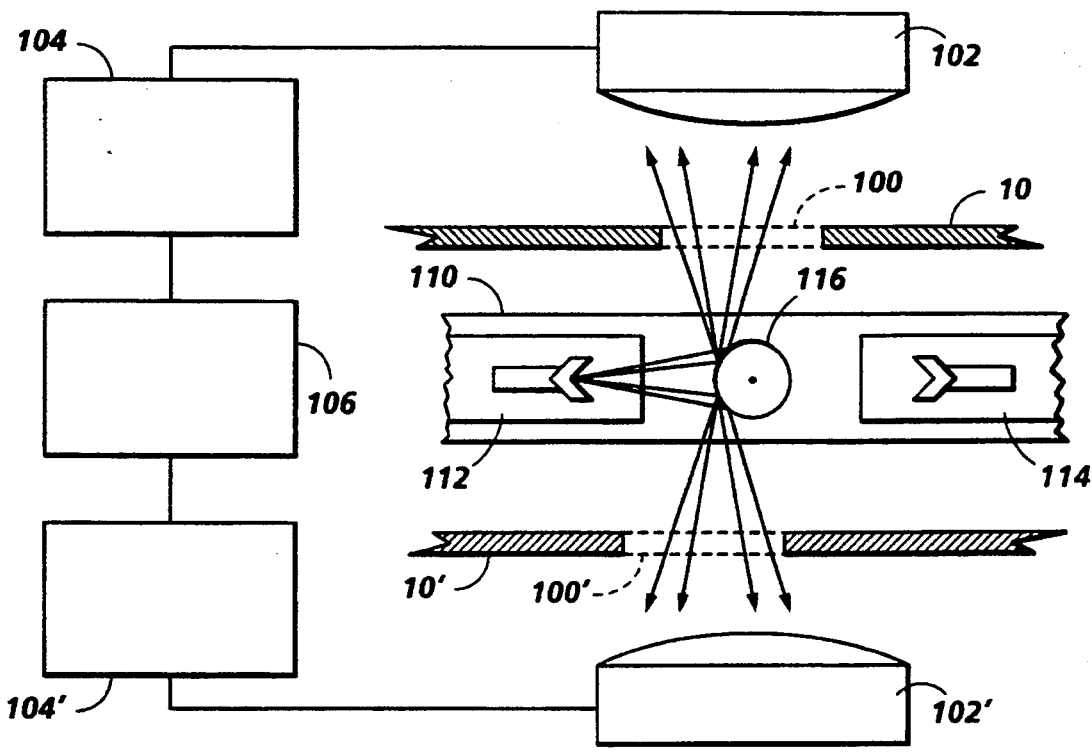
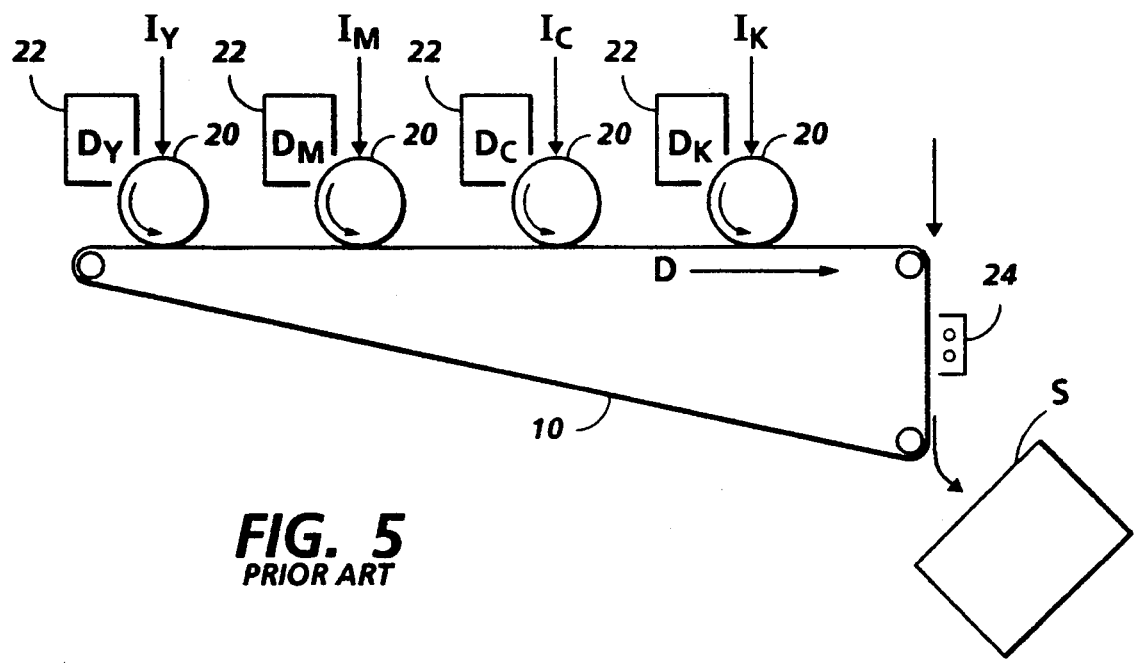
FIG. 5
*PRIOR ART*

APPARATUS FOR DETERMINING REGISTRATION OF IMAGING MEMBERS

The present invention relates to electrophotographic printers, and specifically to an apparatus for determining and ensuring the registration of contacting imaging surfaces in such a printer, particularly when images corresponding to different colors are superimposed.

Electrophotographic printers, in which a charged photosensitive surface known as a "photoreceptor" is selectively discharged according to a desired image to be printed, and the resulting latent electrostatic image developed with pigmented toner to render the image visible, are wellknown. When this process is adapted to create multi-color images in a copier or printer, the registration of the individual color components, called "color separations", on the receiving surface is critical if the composite fullcolor image is to be of consistently high quality. For a simple two-color image, one registration strategy is to print the two separate color images sequentially on the same receiving surface, such as a sheet of paper, which has been affixed to a sliding or rotating mechanism designed to provide unfailing mechanical registration with respect to the photoreceptor. Other techniques are known in the art. For example, the mechanical positioning of latent images exposed on the photoreceptor by electronic means is typically consistent from one frame to the next. By exposing and developing a first image with one colored toner, and without disturbing the toned image, recharging, exposing, and developing a second image with a second colored toner, the registration of the two toner deposits on the photoreceptor surface will match that of the electronically generated latent images and be preserved when the two toner layers are transferred in one step to the copy sheet. Variations on these basic techniques are abundant in the prior art.

Irrespective of the design strategy followed, the precise and accurate registration of the superimposed color separations forming the composite color image either on the photoreceptor surface or ultimately on the copy sheet is critical for high quality results. Even in a simple two-color text document, there are certain registration errors that, in spite of being small on an absolute scale, cause annoying visual artifacts that are readily perceived. In the case of full-color documents, and particularly documents in which a color photograph containing large area of pastels such as sky or water is reproduced, extremely small errors in registration will cause conspicuous and unwanted effects in the printed output. It has beet observed that the registration errors associated with subtile visual artifacts are typically much smaller than the pixels in the image and show up as moiré interference patterns or spatial heterodyne beats commonly referred to a color "banding" in portions of the image in which pixels of two primary colors commingle to form a non-primary hue, such as when green is formed by mixing cyan and magenta. Techniques for the precise and accurate registration of superimposed images are therefore of extreme interest to the color printer and copier industry.

The use of an "intermediate transfer" medium in the form of an endless belt has shown certain practical advantages for high speed throughput full-color electrophotographic printing in a tandem configuration. In a typical electrophotographic printer, an electronically controlled raster-output scanner (ROS) is employed to direct a sharply focussed laser beam onto a photoreceptor drum or belt, discharging the photosensitive surface in accordance with the desired image to be printed. The resulting electrostatic surface charge pattern is developed with toner and brought into direct contact with the output copy sheet for transfer. In an intermediate transfer system, however, an extra step is added. The latent image is created on the photoreceptor and the photoreceptor surface is developed with toner in the same way. However, instead of transferring the toner directly to the output sheet, it is first transferred to a stable intermediate surface in the form of an endless belt. In a tandem configuration, the multiple marking engines each consist of an imaging station and a developer dedicated to generating one color separation, all functioning in parallel. The throughput bandwidth or processing speed of the system is therefore as much as four times higher than is possible with a single imaging station. Working in parallel, each color engine transfers its respective toned color separation onto the intermediate belt, building up the finished composite color image in successive layers. When the intermediate toner deposition is complete it is transferred to the output copy sheet by a combination of electrostatic, hydrostatic, or thermal forces. Thus the primary color separations from each marking engine must be precisely registered on the intermediate belt, and the full-color image is transferred to the output sheet in one step.

It will be apparent, based upon the above description, that the critical registration step for a full-color electrophotographic system using an intermediate transfer belt is between the multiple photoreceptors, one for each primary color and black, and the the intermediate belt. It is important to remember that the photoreceptors and intermediate belt are subject to changes associated with mechanical wear and aging. In particular, it is well known that thin belts under tension tend to creep and stretch, as well as expand and contract as the result of temperature and humidity changes. Furthermore, the useful life of belts and photoreceptors is limited so that periodic replacement of drums and belts can be expected over the life of the machine. Since manufacturing tolerances imply replacement drums with different diameters, belts of varying lengths, and different conicity from unit to unit, it is reasonable to assume that replacement of either the belt or the photoreceptors will adversely affect image registration unless the system architecture is designed to correct registration through a continuous feedback, interactive, or self diagnostic mechanism. To be attractive, a self adjusting system should be fast, simple, and cost effective.

U.S. Pat. No. 4,683,380 discloses an apparatus for "detecting a perforation on a web" in which a single light source is disposed on one side of the web and a pair of spaced-apart photodetectors are disposed on the other side of the web, whereby, when a perforation in the web is in a predetermined position, light from the source directs light through the perforation of equal intensity on both detectors. A differential system is provided for detecting the condition in which the intensity of light on the detectors is equal.

U.S. Pat. No. 4,837,636 discloses a position and motion sensor for a belt in an electrophotographic printer, wherein there is provided a stationary CCD-type photosensitive array aligned with a row of openings on the moving belt. As the belt moves, the openings expose a succession of photosites along the array. The exposure signals of the successive photosites are manipulated with two shift-registers, one for even-positioned and one for odd-positioned photosites.

U.S. Pat. No. 5,175,570 discloses a registration device for an electrophotographic printer, wherein the ends of the image scan line are caused to intersect with registration openings in the belt, and the light passing therethrough strikes photodetectors behind the belt. An error signal is created when the detected position of the openings is not registered with a modulated intensity pattern on the scan line.

U.S. Pat. No. 5,204,538 discloses a densitometer for measuring the saturation of a toner image on a moving photoreceptor belt in an electrophotographic printer. In this situation it is typically necessary to measure the toner density while compensating for the reflectivity of the toner itself. To do this, a focused and an unfocused beam are alternately reflected from the deposited toner onto a single photodetector. The square-wave output amplitude from the photodetector is representative of the true toner density.

The present invention proposes a system for precisely sensing the position of a moving surface, such as a transfer belt, so that extremely precise and accurate registration can be facilitated by means of a feedbackcontrol system. The system of the present invention is particularly useful for ensuring precise and accurate registration of the latent image on a photoreceptor drum with an intermediate transfer belt at exactly the line of contact thereof, which is particularly important in a full-color tandem printer. However, the general principle of the present invention is readily adapted to any similar situations, in a printer or other contexts where precise positioning of two members with respect to each other is required.

According to the present invention, there is provided an apparatus for sensing the position of a substrate having an aperture therein and movable in a process direction. A photodetector is disposed adjacent a first side of the substrate, in a position intersecting a path of the aperture along the process direction. A first light source point and a second light source point are disposed adjacent a second side of the substrate, substantially opposite the photodetector When the aperture is disposed between the first light source point and the second light source point and the photodetector, direct light from both the first light source point and the second light source point is detected by the photodetector. A condition detector associated with the photodetector responds to a condition in which light of substantially equal intensity from the first light source point and the second light source point strikes the photodetector.

In the drawings:

FIG. 4 is a sectional elevational view illustrating the general principle of the present invention, as applied to a situation of ensuring the registration of two moving surfaces;

FIG. 5 is a simplified elevational view showing the basic elements of a tandem-type color electrophotographic printer;

In all the Figures, like reference numbers indicate homologous elements.

Figure 1:
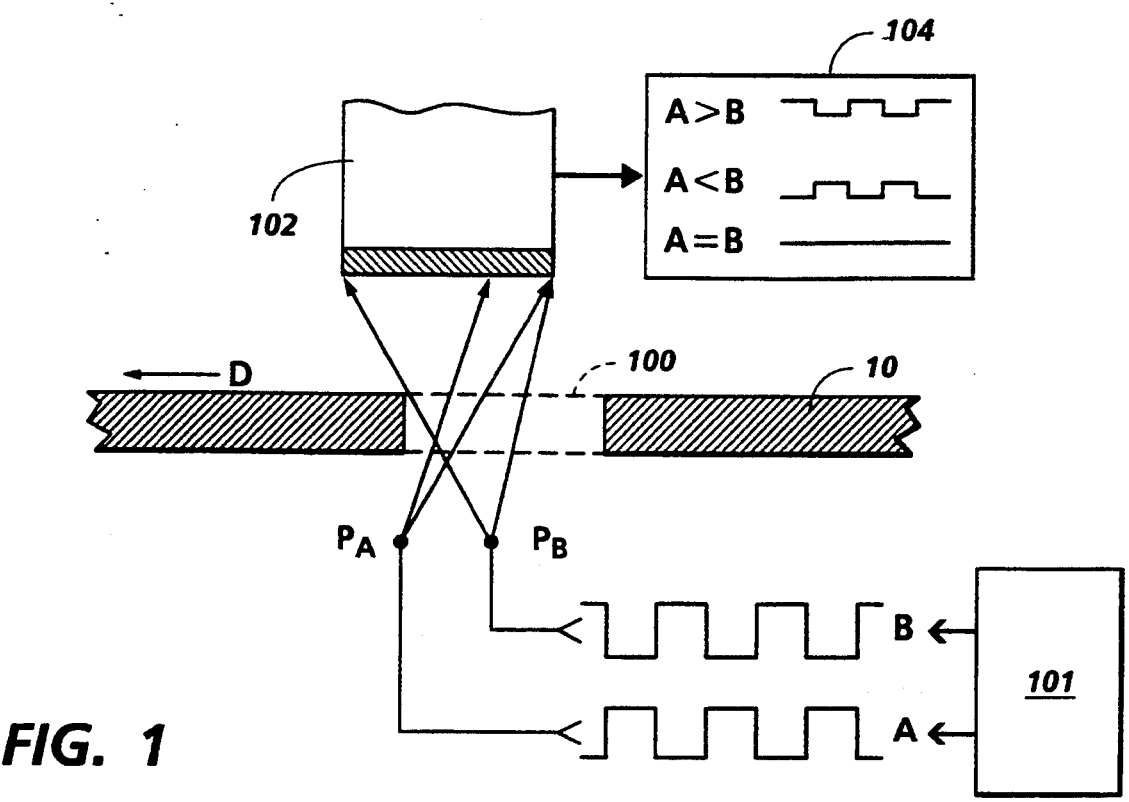
FIG. 1 is a simplified sectional elevational view illustrating the general principle by which the present invention determines the precise position of a moving surface.

FIG. 1 is a simplified sectional elevational view illustrating the general principle by which the present invention determines the precise position of a moving surface such as transfer belt 10. As shown in FIG. 1, transfer belt 10 has defined therein an aperture 100. In the Figure, the aperture 100 is shown as an ordinary opening drilled or punched through the transfer belt 10 although it is possible to provide a special decal or eyelet which is precision-formed for exact dimensions and then attached over a relatively roughly formed hole in the belt 10. When the belt 10 moves in process direction D, the aperture 100 will, of course, move with it along the belt's path.

Disposed adjacent one side of the belt 10 in a stationary position along the path of the aperture 100 is a photodetector 102. Photodetector 102 has a photosensitive surface which is preferably of a size at least comparable to that of the area of the aperture 100. Disposed on the other side of belt 10 in substantially the corresponding position of photodetector 102 is a pair of light sources, shown as $P_A$ and $P_B$. For purposes of the present discussion, $P_A$ and $P_B$ act as point sources of light which may be individually actuated, although, as will be described in detail below, the points $P_A$ and $P_B$ need not be actual light sources themselves. Points $P_A$ and $P_B$ are preferably disposed along a line parallel to the process direction D of belt 10, and are preferably spaced from each other a distance comparable to the width of the aperture 100 and also the width of the photodetector 102, although the spacings of all these elements relative to each other may be varied to obtain a particularly responsive system.

FIG. 1 shows how, when the aperture 100 in the moving belt 10 passes between the photodetector 102 and the sources $P_A$ and $P_B$, light from the respective sources $P_A$ and $P_B$ passes through the moving aperture 100 and strikes the surface of photodetector 102 causing a signal in response to light from either point source. With the aperture 100 in the particular position as shown in the "snapshot" of FIG. 1, it will be noted that, because of the position of the edges of aperture 100, a larger proportion of light from source $P_B$ illuminates the photosensitive surface of photodetector 102, while a lesser proportion of the light from source $P_A$ strikes the photosensitive surface of photodetector 102 because of the greater obscuration by the edge of aperture 100 If one imagines the aperture 100 in belt 10 moving in process direction P, it will be apparent that, as the aperture 100 progresses in time, light from source $P_A$ will be obscured in decreasing proportion by the edge of aperture 100 and, as the right-hand edge of aperture 100 moves to the left, light from source $P_B$ will be obscured in increasing proportion. However, when the aperture 100 is disposed at a certain exact point along the process direction, sources $P_A$ and $P_B$ will illuminate the surface of photodetector 102 in such a way as to render equal output signals from the photodetector. With the moving belt 10, however, this condition of equal response will take place only within a relatively narrow time window According to the present invention, the sources $P_A$ and $P_B$ are respectively actuated with alternating square waveforms A and B, by means of an actuator circuit 101 generally shown in FIG. 1. When A is on B is off, and vice-versa. The effect of this alternating activation of the sources on the output signal from the photodetector 102 can be seen in the lower portion waveforms in FIG. 1. As the aperture 100 positioned between the point sources and the photodetector moves, progressively more light reaches photodetector 102 from source $P_A$, and progressively less light reaches photodetector 102 from source $P_B$. Because of the alternating actuation of the sources, the response of the photodetector 102 will be periodic, as shown by the waveforms in FIG. 1. When both sources cause exactly equal photocurrent in photodetector 102 the output from the photodetector 102 will be constant in time as indicated by a flat line as shown in FIG. 1. In addition to the relative obscuration of the two sources $P_A$ and $P_B$, this balance position will depend on the relative intrinsic intensities of the two light sources which may not be identical, their relative distances from the photo detection surface, as well as the sensitivity of the photodetector itself which may not be strictly uniform over its photoactive surface. It will be understood by those familiar with the art that the light sources may be adjusted for relative symmetry by noting the signals generated in the absence of any aperture, and that the residual errors do not affect repeatability. Thus, when the photodetector 102 output is nonzero but contains no alternating intensity component indicated by the flat line in the figure, (there will obviously be neither direct nor alternating output components if the aperture 100 is nowhere near the photodetector 102, and the light of both sources is totally obscured) the aperture 100 will be known to be within very close limits of a precisely defined position. Furthermore, the phase of the alternating component of output signal is useful in determining the sense of the actual position with respect to the balance point, and within a narrow range on either side of the balance point, the amplitude of the residual alternating component can, in some instances, be calibrated to indicate both the direction and the instantaneous physical displacement from the balance position. The method of determining the exact point in time when the alternating component of the output vanishes is extremely useful in determining the relative position of the aperture 100, and thereby of the entire belt 10 with respect to the light source and photodetector assembly. FIG. 1 shows a condition detector 104, adapted to detect the vanishing point of the alternating output from photodetector 102. The "flat" condition of the output of photodetector 102 is readily detected, for example, by incorporating a simple AC coupled amplification circuit with high gain, and a phase sensitive switch or other device indicating the crossover from a condition of strict balance to slight imbalance.

It may also be useful in the system of the present invention to provide in the condition detector 104 a subsystem whereby the presence of any light from either point source is detected by the photodetector 102; such a provision may be useful when the detection of leading and trailing edges of the aperture 100 is of interest, for example, to arm timing circuits or interrupt a computer routine in advance of the balance condition.

The advantage of the general principle of the present invention resides mainly in the fact that means for precisely determining the balance position of the belt aperture is very repeatable and can be relatively inexpensively obtained. For a practical application of such a device, a preferred frequency for alternately actuating the sources is between 10 Hz and 10 MHz, but preferably a few hundred kHz, which is easily obtained with inexpensive electronic components, and provides a typical net position sensitivity of 2 or 3 microns, including hysteresis, which is the difference in balance indication for forward and reverse motion of the aperture through the balance point. Another key advantage of the general principle of the present invention is that the system has been found to be satisfactorily indifferent to the exact level of the belt between the sources and the photodetector; that is, the system has been found to work repeatably and give the same balance point over a wide range of levels, from where the belt aperture happens to be relatively close to the photodetector, to where it is much closer to the sources and relatively distant from the photodetector. This feature is of practical importance in a high speed belt system where an unsupported belt can exhibit instability and flutter as it moves through the machine at high speed. In fact, the system geometry is such that the photodetector and opposing sources do not necessarily have to be disposed with particularly great precision relative to the rest of the system.

The general principle of the present invention is based, significantly, on AC stimulation and response. The alternating actuation of the light sources creates an output signal from the photodetector which is easily processable by conventional AC coupled circuitry as an AC input of a given frequency. A condition detector for determining the balance point need only sense the absence of an output square wave; provided sufficient amplification is applied, the absolute value of the signal is, in terms of designing a practical system, barely significant. Because very stable circuitry with enormous AC amplification can be provided at the frequency range of interest, the designer has much latitude in selecting the absolute range of movement and circuit design parameters for the registration system. Further, a system which is based on a relative amplitude of AC signals and not the absolute value of DC signals bypasses the design difficulties of linearity, matching of components, temperature drift, and aging of subcircuits within the system. Further still, within reason, such an AC system automatically discounts for the presence of irrelevant light from an external source impinging on the photodetector: such interference will shift the mean absolute intensity of light flux on the photodetector, but have little effect on the relative output response to light from the alternating sources. In brief, the AC-based system of the present invention provides numerous substantial practical advantages over systems which respond to absolute light intensities.

Figure 2:
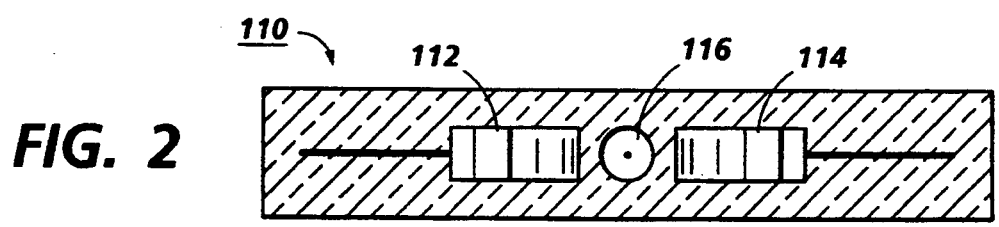
FIGS. 2 and 3 are, respectively, elevational and plan views of an optical component useful in a preferred embodiment of the invention.
Figure 3:
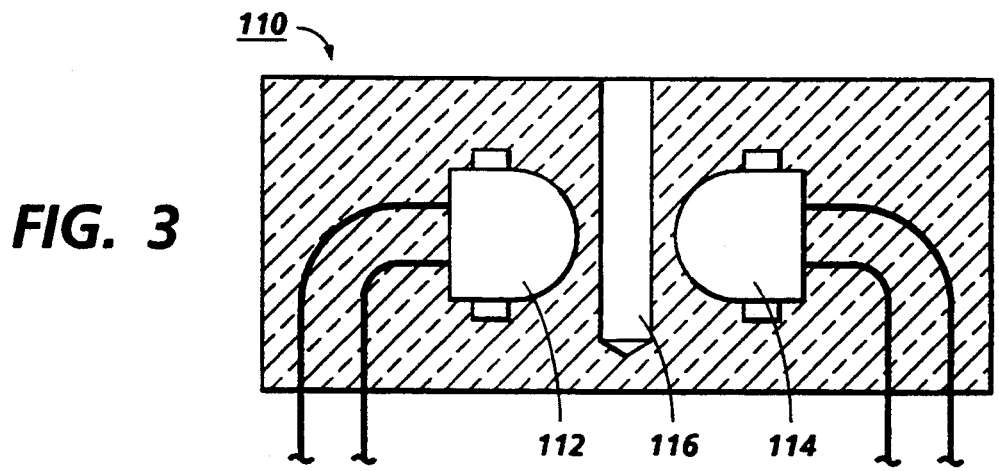

As mentioned above, the sources $P_A$ and $P_B$ need not be actual light sources, but can be virtual points or lines in space which emit flux like real sources. That is, the virtual sources can be created by reflecting light emitted from a real light source in another location. This property is very convenient and leads to another aspect of the preferred embodiment of the system. FIGS. 2 and 3 are, respectively, elevational and plan views of an optical component 110 which represents a preferred embodiment of the present invention. The body of optical component 110 is an optically transparent block in which is disposed two LEDs 112 and 114, which represent, respectively, the real light sources that provide the flux for the sources $P_A$ and $P_B$ in FIG. 1. The LEDs 112 and 114 face each other within the optical component 110, and disposed therebetween is a void 116 having a polished inner surface, so that the surface of the void I 16 acts as a cylindrical mirror through total internal reflection. An optical assembly such as component 110, measuring roughly 1 cm in the longest dimension and about 2 mm in thickness, may be easily manufactured with readily available electrical components. It will be apparent that the diameter of the void 116 can be arbitrarily small, but it has been found that the range between 0.5 and 1.5 mm is most convenient. When light flux from the LEDs strikes the interface at the polished surface of void 116, it is redirected through total internal reflection as is well known, and forms a virtual focus within the volume of the void 116 which serves as the virtual source $P_A$ or $P_B$. Thus the pair of virtual sources $P_A$ and $P_B$ are within the void and may be disposed arbitrarily close to each other while retaining perceptibly distinct locations simply by scaling the dimension of the void diameter. If the diameter of the void 116 is 1 mm for example, the virtual point sources will be about 0.7 mm apart; the closer the point sources are from one another, the finer the system and the higher the sensitivity of the balance point.

One important advantage of using a cylindrical surface, such as shown for the void 116, is that the virtual source geometry is symmetric about a plane containing the light source and the axis of the cylinder. FIG. 4 is a detailed sectional view showing first how light from an LED 112 is reflected from the surface of the void 116 and directed through an aperture 100 onto a detector 102, and also, how another portion of the light from LED 112 is reflected from another portion of the surface of void 116 to be directed in an opposite sense through another aperture 100' in another belt 10' to strike another photodetector 102'. The symmetry of the cylinder 116 thus provides two useful reflecting geometries for each LED, creating matched pairs of virtual sources. More importantly, as is clear in FIG. 4, the optical component 110 also facilitates a system by which the relative positions of two moving belts, 10 and 10' can be precisely determined with respect to each other via a common fiducial point even when the exact position of the fiducial point is only approximately known. Photodetectors 102 and 102' respond to light from the same alternating LEDs 112 and 114. It should be noted that the configuration of opposed real light sources and orthogonal photodetector pairs has certain inherent error compensating characteristics which are extremely valuable in the present context. It is understood that in contrast to the ideal symmetric case, inequality in the brightness of the light sources will shift the actual balance point away from the ideal balance position. However, any shift occurring on the side directing light flux to photodetector 102 is matched by an equal shift on the side directing flux to photodetector 102', such that the error in sensing the relative positions of apertures 100 and 100' with respect to each other vanishes. Likewise, the error introduced because the void is not centered exactly at the midpoint between the real sources also vanishes. Furthermore, should the void be offset slightly toward one detector so that it is not exactly centered in the plane connecting the two real light sources, there will again be no net shift in the balance point for either aperture 100 or 100'. The cancellation of the errors associated with the exact position of the void can be understood from the point of view that the sensing of both apertures is made with respect to the void, and moving the void simply shifts the nominal center of the balance points. In other words, in sensing apertures on adjacent members, the present invention is differential in behavior and has high common mode signal rejection. Obviously the insensitivity to these various error modes assumes that the void has a high degree of axial symmetry, which is relatively easy to provide with a machined or cast assembly, and that the alternating light sources and photodetectors are positioned in an orthogonal configuration with a reasonable degree of accuracy. Clearly, then, this design is particularly useful in determining the relative positions of apertures in pairs of members such as is the case with a photoreceptor and a transfer belt in a full-color electrophotographic printer.

As shown in FIG. 4, photodetector 102 and 102' are respectively operatively connected to condition detectors 104 and 104', each condition detector adapted to be sensitive to the AC output signal from the photodetector indicative of the displacement of the aperture with respect to the balance point position. Further, the condition detectors 104 and 104' are connected to a timer-comparator 106, which is adapted to determine the time overlap of the balance points from the two condition detectors 104 and 104', to yield, as necessary, a signal indicative of the degree with which the respective apertures 100 and 100' are in registration or misregistration with respect to each other.

FIG. 5 is a simplified elevational view showing the basic elements of a "tandem" full-color electrophotographic printer utilizing an intermediate transfer belt 10. The transfer belt 10 is entrained around a set of rollers, as shown. Along the path of the transfer belt 10 is a series of stations, at each of which a quantity of toner in the configuration of a color component of a desired image to be printed is placed on the transfer belt 10. Each station includes, among other elements, a rotating photoreceptor drum 20, and a developer station 22. As shown in FIG. 5, there are four such stations 22 corresponding to the yellow (Y), magenta (M), cyan (C), and black (K) toner. As is well known, each full-color image produced by the system will comprise toner from each of these four stations. Each photoreceptor 20, which is in the form of a drum or other rotatable structure (such as a short belt) accepts an exposure labeled as Iy, IM, etc. in FIG. 5, corresponding to the color component image for that color, which is used to create the electrostatic latent image on the particular photoreceptor 20. The exposure may be created by, for example, one or more raster output scanners (ROSs) which, as is well known in the art, typically comprise a rotating mirror and optical components (not shown) in order to scan an image embodied in digital data onto the photoreceptor. As is well known in the art, a developer station 22, here labeled according to color as $D_Y$, $D_M$, etc. is placed downstream of the place where the image is exposed such that as the photoreceptor rotates it causes toner of a given color to adhere to the charged portions of the latent image on the photoreceptor. As the photoreceptor drum 20 further rotates, the drum surface and the toner adhering thereto is brought into contact with the surface of the intermediate transfer belt 10. The toner on each photoreceptor drum is caused to transfer to the surface of belt 10 by applying a suitable electric field supplied by a transfer corotron (not shown) so that the toned pattern on the photoreceptor drum is redeposited on the surface of the intermediate transfer belt 10. Each photoreceptor drum 20 in turn deposits on the surface of belt 10 one toner color separation which must be in common registration with the other color toner deposits in order to render a satisfactory full-color image on belt 10, which, in turn, is ultimately transferred by a subsequent transfer corotron 24 to the print sheet, shown as S.

As mentioned above, a full-color electrophotographic printer such as that shown in FIG. 5 presents substantial problems of ensuring the registration of the latent image and resulting toner deposit on each photoreceptor drum 20 so that the successive component color images. may be deposited at a common point of superposition on the transfer belt 10 with high precision. It is the precision interfacing between the developed image on each photoreceptor drum 20 and the transfer belt 10 which presents the greatest engineering challenge and is particularly suitable for the registration system of the present invention.

Figure 6:
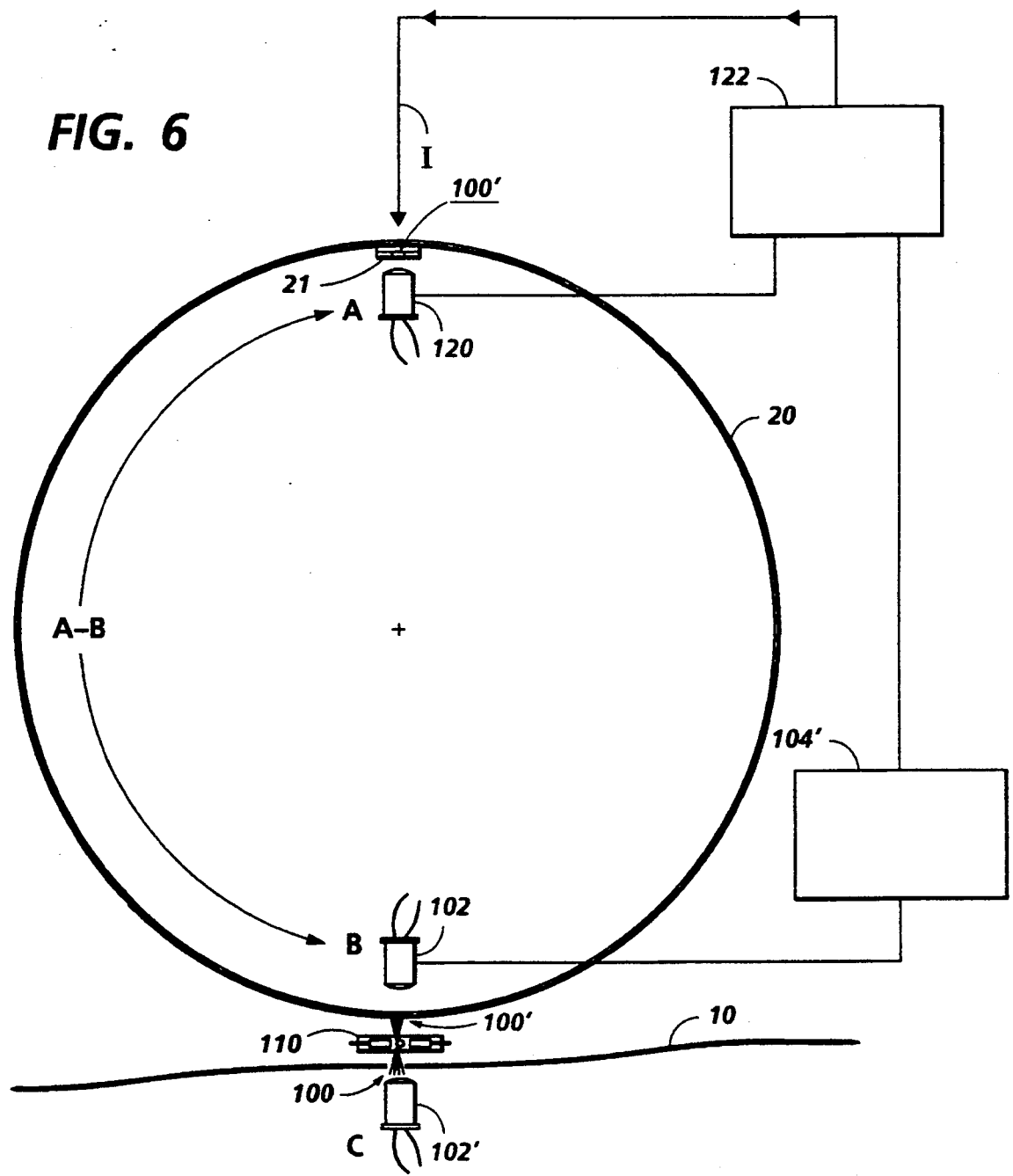
FIGS. 6 and 7 are, respectively, orthogonal elevational views of a system according to the present invention applied to a tandem-type color electrophotographic printer.
Figure 7:
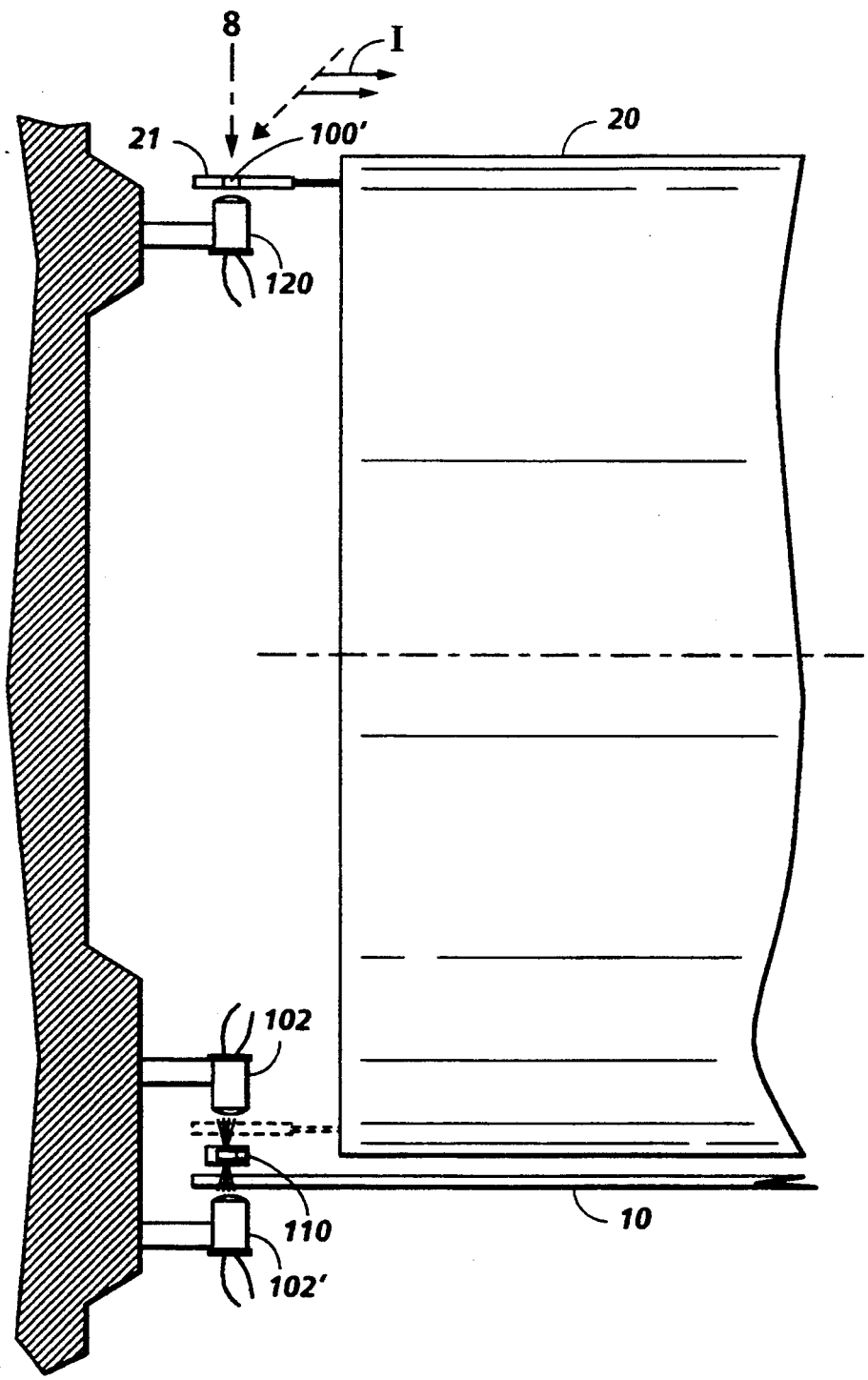

FIG. 6 is a detailed elevational view of photoreceptor drum 20 as it interacts with the intermediate transfer belt 10, showing how the system of the present invention may be readily utilized in a printer. A scanning laser beam from a ROS, typically in the form of a collimated laser beam focussed on the photoreceptor surface and scanned in a straight line labeled I in the figure, exposes a narrow path along the length of the drum 20 (going into the page, in the view of FIG. 6). FIG. 7 is an elevational view orthogonal to the side view of FIG. 6 showing that there is provided at the end of the drum 20 at least one structure 21 which has the aperture 100' defined therein. For clarity in FIG. 7, the structure is shown as a separate element extending away from the drum, but could equally well be integrated into the surface of the drum at its edge, or fashioned as part of the drum end bells, close fitting circular members typically employed to support relatively thin cylindrical drums on a rotational axis. It will be noted that, toward the bottom of both FIGS. 6 and 7, at a point near where the drum 20 contacts belt 10, that there is provided an optical component 110 which interacts both with an aperture 100 on belt 10, and a similar aperture 100' on the structure 21 attached to drum 20. The photodetector pair 102 and 102' and optical component 110 operate together in the same manner as illustrated in, for example, FIG. 4, where like numbers indicate homologous elements. The present invention thus provides a system for determining the relative position of the surface of a photoreceptor drum 20 with respect to the transfer belt 10. One advantage of using a structure 21 disposed as a separate element attached to drum 20 is that, as can be seen toward the bottom of FIG. 6, space may be conveniently provided between the structure 21 and the belt 10 for the optical component I 10 to be disposed therebetween with comfortable mechanical clearance with the surface of drum 20 in intimate contact with the surface of belt 10.

Also, toward the top portions of FIGS. 6 and 7, another photodetector, indicated as 120, accepts light from the end portions of scan line I used to create the latent image on the photoreceptor drum. Photodetector 120 is located in a fixed position aligned with the path of the scan line I on the surface of drum 20 where the latent image is exposed. It can be seen that the aperture 100' defined in structure 21, which is used to determine the registration of the drum with respect to the belt, also interacts with photodetector 120 and the light from the end portions of scan line I yielding a signal from photodetector 120 indicating the relative alignment of the aperture 100' and the end portions of scan line I as it passes thereover.

As discussed above, apertures 100 and 100' shaped in the form of simple rectangular windows can be conveniently provided as transparent or translucent areas in an otherwise opaque adhesive decal printed at low cost and attached over punched or otherwise machined clearance holes. For simplicity, the decal forming aperture 100' that would be affixed to structure 21 has been treated as identical to those forming apertures 100 when applied to belt 10. It will be understood by those familiar with the art that the patterns printed on the decals are generally unlimited in scope so that the "aperture" may actually be a plurality of patterns tailored to generate several distinct output signals, or can equally well be compound patterns with multiple applicability in different environments.

Figure 8A:
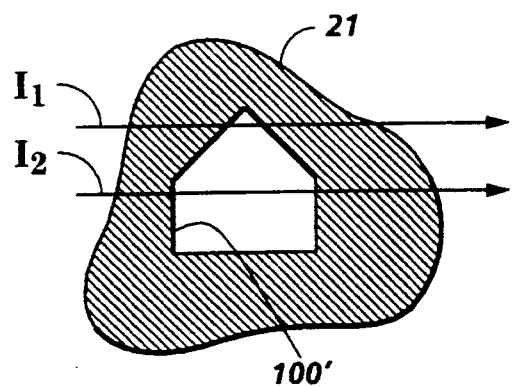
FIGS. 8A and 8B are plan views of two possible shapes of apertures used in one embodiment of the present invention to interact with a scan line from a raster output scanner, as viewed from the direction marked 8 in FIG. 7.
Figure 8B:
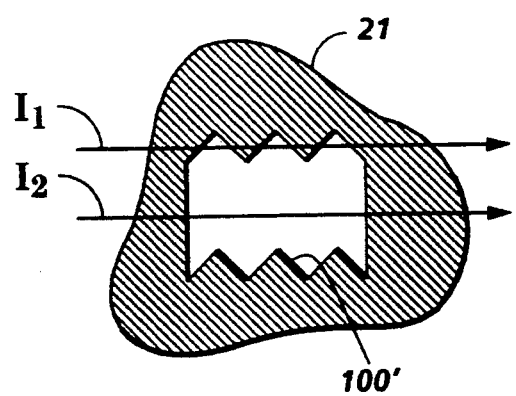

The decal on structure 21 can, in addition to a rectangular window defining aperture 100', also incorporate one or more patterns with which scan line I interacts to indicate relative alignment between the scan line and the aperture with a resolution of much less than one scan line width. FIGS. 8A–8b show representative shapes of an aperture 100' which may be used in a high-precision system of the present invention. The leading and trailing edges of the rectangular aperture 100' could be slightly skewed or tilted to form a symmetric trapezoid or parallelogram, as in FIG. 8A, incorporating a "chevron," typically in the form of a taper or serration, as part of the aperture outline. If the contour of the slanted edge is comparable to the width of one scan line, the first scan line, shown as I1 in FIG. 8A, to impinge through the aperture (to be detected by the photodetector 120) will cause a small "blip" to be output from photodetector 120 prefatory to subsequent scan lines, such as $I_2$ in the Figure, crossing though the entire width of the aperture. The time duration of the first "blip" as scan line $I_1$ interacts with the "chevron" could be accurately measured to determine the exact position of scan line $I_1$ relative to the aperture, which is to say the exact position of the entire photoreceptor drum 20 relative to scan line I. The leading and trailing edges of aperture 100' may also be serrated to the same end, as in FIG. 8B. Another possibility is to provide an apodization of the leading and trailing edges, the apodization being in the form of rectilinear edges with tapered rather than abrupt light attenuation profiles, such that the exact position of scan line I with respect to an edge would be revealed by the degree of attenuation of the flux delivered in line I. Another design possibility is to provide multiple, separate aperture paths along the edge of drum 20, so that apertures in one path are positioned to interact with the optical component 110 and apertures in another path are positioned to interact separately with scan line I.

The signals from photodetector 120 can be used in combination with the relative registration from photodetectors 102 and 102', as already described, to determine the relative registration that will exist between the latent image and hence the resultant toned image on each photoreceptor drum surface, and one or more apertures affixed to the intermediate transfer belt surface. Thus the present invention provides a means for implementing an automatic registration system designed to revise the positioning of the latent image on the photoreceptor drum surface, for example by articulating the scan line I in FIGS. 6 and 7 by mechanical means such that the exposure path is shifted slightly with respect to the surface of the drum. Alternatively, the data can be revised and delayed in time so that the resultant latent image is shifted along the scan path, or along the direction of motion of the drum 20, or both. Either of these or equivalent mechanisms can be employed singly or in combination to revise the location of the latent image on an ongoing basis to correct for misregistrations including those that are the result of replacing the intermediate transfer belt, or any or all of the photoreceptor drums, as well as the normal sources of registration fluctuations encountered over the life of a printing machine.

As mentioned above, there must be extremely precise regulation of the raster of scan lines I forming the latent images on the photoreceptor drums so that the resulting developed images are deposited onto the transfer belt in accurate superposition. For this registration the crucial parameter is the effective distance an image on the drum surface travels between formation by the scan line I and transfer onto the belt surface, which is indicated by the arc length (A-B) in FIG. 6. More precisely, the arc length A-B is measured in degrees or time such as, for example, would be provided by a regulated clock or a shaft encoder adapted to register the rotational movement of the drum. In the present context it is assumed that the rotational speed of the drum is regulated within reasonable limits so that arc length and time period are equivalent. Measuring the arc length A-B in terms of degrees or time avoids the problem of requiring the system to take into account drum eccentricity and out-of-round distortions which do not affect the time of arrival of the toner patterns at the transfer zone. The arc length A-B is likewise determined in terms of elapsed time, arc segment angle, encoder counts, or equivalent units. Clearly, if the scan line is displaced upstream or downstream with respect to the rotation of the drum, the measured arc A-B will reflect this change. It therefore remains only to define the desired common reference point or datum of the image to be deposited on the intermediate belt.

As a specific example, assume the passage of a scan line such as $I_1$ in FIG. 8A or 8B over the leading edge of aperture 100' occurs between encoder counts N and N+1 and is further determined to be displaced from that edge by a fraction F of the distance between encoder counts using the skewed or serrated edge method. The nominal intersection of the scan line with the leading edge is therefore at count N+F. Assume further that the passage of the scan line I over the trailing edge of aperture 100' occurs between encoder counts N' and N'+1 and that the corresponding fractional count is F'. This implies that the center of the aperture passes under the path of scan line I at count (N+N')/2 with a net fractional offset of (F+F')/2. It is understood that the fractional offset simply means that the scanning spot defining line I is somewhere along the scan path creating the latent image on the photoreceptor surface at the exact moment that the geometric center of the aperture is positioned directly under the center of the scan line path.

Having established point A, the location of a given scan line on the surface of drum 20, in terms of encoder counts, point B, the transfer point between the drum 20 and the transfer belt 10 for the scan line, is identified by the balance condition that exists when the aperture is located at optical component 110. Since the sources in component 110 alternate at relatively high frequency, it is straightforward to determine the encoder count M at which balance is first noted, and identify the fraction K of an encoder count thereof based, for example, on the proportion of oscillations from the actuator circuit operating the optical component 110 that take place between encoder counts before or after balance is reached. The arc A-B is thus established as (N+N')/2+(F+F')/2−(M+K) encoder counts, and an exposure that is made by scan line I will arrive adjacent the nominal balance point of optical component 110 after this period. Obviously, since structure 21 encounters scan line I and optical component 110 on each revolution of the drum, the arc A-B can be redetermined each cycle, averaged over several or many cycles, and the results filtered and otherwise numerically manipulated as desired.

All that remains is to determine where the component toner images are to be colocated with respect to the aperture 100 on belt 10. For the purposes of a specific example, suppose the arc length A-B for a given photoreceptor drum 20 is found to be 2129.6 encoder counts by the above method, and it is agreed to employ one aperture 100 for each image panel in the printing machine with image placement (i.e., leading edge scan line) 2200 encoder counts downstream from the geometric center of each aperture 100. Therefore, in order that the leading edge of the toned image on the drum surface arrive at the prescribed point on the intermediate belt surface, the first valid scan line in the latent image must be formed 70.4 encoder counts (2200−2129.6) following detection of the balance point for each aperture 100 on belt 10. Clearly, in a full-color system such as shown in FIG. 5, the arc A-B for each color drum will have an independent value which changes with time. As these changes take place, the corresponding leading edges of the latent images are shifted to compensate and cancel the changes.

It should be noted that correct registration is maintained at each processing step even when the image panels on the intermediate belt 10, as defined by the placement of apertures 100 therein, are unequally spaced such as might be desirable in avoiding a belt seam. It should also be noted that a ROS scanner is normally limited to image shifts of whole scan lines unless the scan beam can be articulated at finer resolution. This restriction does not apply to an exposure-on-demand imaging device.

The mechanisms and technique for detecting and correcting deviations in image placement in the process direction can be adapted to sense errors in image placement along the orthogonal direction, i.e., parallel to the scan line or laterally. Scan line I intersects the inboard and outboard edges of aperture 100', and optical component 110 can be adapted to identify the lateral position of apertures 100' and 100 using skewed edges, serrated edges, or decal patterns containing chevrons or equivalent special shapes optimized to provide convenient and unambiguous signals useful for the purpose of precise lateral registration in a multicolor printing machine such as in a tandem configuration. Thus optical component 110 might contain one or more central voids with one or more pairs of virtual light sources and one or more pairs of real light sources alternated simultaneously or sequentially.

Another useful application of the registration system of the present invention in the context of a tandem color printer is a configuration using two such systems for each photoreceptor drum 20, one on either end thereof.

In this way the arc length (A–B) may be determined independently for each end of the drum to indicate the presence of an unwanted skew in the raster exposure of scan line I resulting in a skewed toner deposit on belt 10. Unlike the previous discussions where an aperture is advantageously positioned to indicate a datum for each image panel on belt 10, a single aperture suffices on the opposing edge of belt 10 for the purposes of providing a reference or datum for skew correction, because the single opposing aperture defining skew error necessarily applies to all image panels equally. A general discussion of scan line skew and bow and the image quality problems attendant therewith, as well as a discussion of a system for eliminating such anomalies, may found in US-A-5,153,608, incorporated by reference herein.

While this invention has been described in conjunction with various embodiments, it is evident that many alternatives, modifications, and variations will be apparent to those skilled in the art. Accordingly, it is intended to embrace all such alternatives, modifications, and variations as fall within the spirit and broad scope of the appended claims.

I claim:

1. An apparatus for positioning a substrate movable in a process direction, the substrate defining an aperture therein, comprising:
   a photodetector disposed adjacent a first side of the substrate;
   means for forming a first light source point and a second light source point, disposed adjacent a second side of the substrate substantially opposite the photodetector, the first light source point and the second light source point being positioned whereby, when the aperture is disposed between the light source points and the photodetector, direct light from both the first light source point and the second light source point is capable of being detected by the photodetector;
   the forming means comprising a first light source, a second light source, and a non-opaque optical component adapted to receive light from the first light source and the second light source, and including a reflector in the form of a void defining a cylindrical surface in the optical component; and
   a condition detector associated with the photodetector, for detecting a condition in which light of substantially equal intensity from the first light source point and the second light source point is detected by the photo detector.

2. An apparatus as in claim 1, further comprising an actuator for controlling the forming means to alternately actuate the first light source point and the second light source point.

3. An apparatus as in claim 2, wherein the actuator is adapted to control the forming means to alternately actuate the first light source point and the second light source point at a frequency of between 10 Hz and 10 MHz.

4. An apparatus as in claim 1, wherein the forming means forms the first light source point and the second light source point along a line substantially parallel to the process direction.

5. An apparatus as in claim 1, wherein the condition detector is adapted to detect a condition wherein any light is transmitted from one light source point to the photodetector.

6. An apparatus for positioning a first substrate having means defining a first aperture attached thereto, and movable in a process direction relative to a second substrate having means defining a second aperture attached thereto and movable in the process direction, comprising:
   a first photodetector disposed adjacent a position intersecting a path of the first aperture along the process direction;
   a second photodetector disposed adjacent a position intersecting a path of the second aperture along the process direction;
   means for forming a first light source point and a second light source point, disposed between the first and second apertures substantially opposite the first and second photodetectors, the first light source point and the second light source point being positioned whereby, when the aperture is disposed between the first light source point and the second light source point and one of the first and second photodetectors, direct light from both the first light source point and the second light source point is capable of being detected by one of the first and second photodetectors; and
   a condition detector associated with the first and second photodetectors, for detecting a condition in which light of substantially equal intensity from the first light source point and the second light source point is detected by one of the first and second photodetectors.

7. An apparatus as in claim 6, wherein the the first light source point and the second light source point are arranged along a line parallel to the process direction.

8. An apparatus as in claim 6, wherein the forming means comprises:
   a first light source,
   a second light source, and
   a reflector, adapted to reflect light from the first light source and the second light source, thereby creating the first light source point and the second light source point.

9. An apparatus as in claim 7, wherein the reflector comprises means defining a cylindrical surface.

10. An apparatus as in claim 9, further comprising a nonopaque optical component adapted to receive light from the first light source and the second light source, and wherein the reflector is in the form of a void defined in the optical component.

11. An apparatus as in claim 6, further comprising an actuator for controlling the forming means to alternately actuate the first light source point and the second light source point.

12. An apparatus as in claim 11, wherein the actuator is adapted to control the forming means to alternately actuate the first light source point and the second light source point at a frequency between 10 Hz and 10 MHz.

13. An apparatus as in claim 6, further comprising
   a timer comparator associated with the condition detector for determining a time overlap of conditions in which light of equal and nonzero intensity from the first light source point and the second light source point are detected by the first and the second photodetector.

14. An apparatus as in claim 13, wherein the first substrate is in the form of a rotatable structure, and further comprising
   a third photodetector adapted to detect light from an external source through the first aperture in the first substrate.

15. An apparatus as in claim 14, further comprising a controller, responsive to the first photodetector and the third photodetector, for measuring a time period between an exposure of the third photodetector through the first aperture and a condition in which light of substantially equal intensity from the first light source point and the second light source point is detected by the first photodetector.

16. An apparatus as in claim 15, wherein the first substrate is a photoreceptor adapted to accept a series of scan lines to create an electrostatic image thereon.

17. An apparatus as in claim 16, wherein the third photodetector is adapted to accept light from the scan lines.

18. An apparatus as in claim 17, further comprising means, responsive to the controller, for controlling the behavior of image data within the scan lines.

19. An apparatus as in claim 17, further comprising a shaped aperture in the first substrate, the shaped aperture defining a chevron in the shape thereof, the chevron being adapted to cause an output of a predetermined type from the third photodetector when a scan line intersects with the chevron.

20. An apparatus as in claim 19, wherein the controller is adapted to recognize an output of the predetermined type from the third photo detector.

* * * * *